United States Patent
Sun

(10) Patent No.: US 10,691,706 B2
(45) Date of Patent: Jun. 23, 2020

(54) METHOD AND APPARATUS FOR MATCHING NAMES

(71) Applicant: Alibaba Group Holding Limited, George Town (KY)

(72) Inventor: Qingqing Sun, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/397,792

(22) Filed: Apr. 29, 2019

(65) Prior Publication Data

US 2019/0251085 A1    Aug. 15, 2019

Related U.S. Application Data

(63) Continuation of application No. PCT/CN2017/111604, filed on Nov. 17, 2017.

(30) Foreign Application Priority Data

Nov. 25, 2016 (CN) .......................... 2016 1 1055619

(51) Int. Cl.
*G06F 17/30* (2006.01)
*G06F 16/2458* (2019.01)
(Continued)

(52) U.S. Cl.
CPC ...... *G06F 16/2468* (2019.01); *G06F 16/2455* (2019.01); *G06F 16/3332* (2019.01);
(Continued)

(58) Field of Classification Search
CPC ............. G06F 16/90344; G06F 17/278; G06F 16/215; G06F 16/29; G06F 16/24556;
(Continued)

(56) References Cited

U.S. PATENT DOCUMENTS 8,364,692 B1 * 1/2013 Allen ................ G06F 16/90344
707/758
8,423,563 B2    4/2013 McPeake et al.
(Continued)

FOREIGN PATENT DOCUMENTS

CN    101727464    8/2012
CN    103167056    6/2013
(Continued)

OTHER PUBLICATIONS

International Preliminary Report on Patentability in International Application No. PCT/CN2017/111604, dated May 28, 2019, 8 pages (with English Translation).
(Continued)

*Primary Examiner* — Dangelino N Gortayo
(74) *Attorney, Agent, or Firm* — Fish & Richardson P.C.

(57) ABSTRACT

An input comprising a name to be matched is received, where the name includes a plurality of words. A first name set corresponding to the name is determined, where the first name set includes a plurality of elements. Each of the plurality of words is matched with each of the plurality of elements based on a similarity degree to generate a standard name set. Whether the name is synonymous with at least one standard name in the standard name set is determined, where one or more characters of the name is not identical with one or more characters of the standard name. In response to determining that the name is synonymous with the at least one standard name, a matching result of the name is generated.

17 Claims, 6 Drawing Sheets

(51) Int. Cl.
*G06F 16/33* (2019.01)
*G06F 16/903* (2019.01)
*G06F 40/30* (2020.01)
*G06F 40/247* (2020.01)
*G06F 16/2455* (2019.01)

(52) U.S. Cl.
CPC .... *G06F 16/3343* (2019.01); *G06F 16/90344* (2019.01); *G06F 40/247* (2020.01); *G06F 40/30* (2020.01)

(58) Field of Classification Search
CPC .............. G06F 16/951; G06F 17/2795; G06F 16/1748; G06F 16/2468
USPC ................ 707/758, 736, 748, 750, 755, 802
See application file for complete search history.

(56) References Cited

U.S. PATENT DOCUMENTS

| | | | |
|---|---|---|---|
| 9,424,556 B2* | 8/2016 | Ollila | G06Q 10/10 |
| 9,691,075 B1* | 6/2017 | Ray | G06Q 30/0201 |
| 2004/0024760 A1* | 2/2004 | Toner | G06F 16/90344 |
| 2005/0084152 A1 | 4/2005 | McPeake et al. | |
| 2006/0074883 A1 | 4/2006 | Teevan et al. | |
| 2007/0198600 A1* | 8/2007 | Betz | G06F 16/2365 |
| 2008/0091674 A1* | 4/2008 | Allen | G06F 17/278 |
| 2011/0055234 A1* | 3/2011 | Miettinen | G06F 16/90344 707/755 |
| 2012/0016663 A1 | 1/2012 | Gillam et al. | |
| 2012/0102002 A1* | 4/2012 | Sathyanarayana | G06F 16/215 707/687 |
| 2013/0282645 A1 | 10/2013 | Culbertson et al. | |
| 2014/0156263 A1 | 6/2014 | Maguire | |
| 2016/0299895 A1* | 10/2016 | Patman Maguire | G06F 16/24578 |

FOREIGN PATENT DOCUMENTS

| | | |
|---|---|---|
| CN | 103177122 | 6/2013 |
| CN | CA 104008123 | 8/2014 |
| CN | 104331475 | 2/2015 |
| CN | 104765858 | 7/2015 |
| CN | CA 104820713 | 8/2015 |
| CN | 105843950 | 8/2016 |
| EP | 2860645 | 4/2015 |
| RU | 2419858 | 5/2011 |
| TW | I443529 | 7/2014 |

OTHER PUBLICATIONS

International Search Report and Written Opinion in International Application. No. PCT/CN2017/111604, dated Feb. 14, 2018, 14 pages (with English translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in European Application No. 17874581.6, dated Sep. 16, 2019, 10 pages.

* cited by examiner

METHOD AND APPARATUS FOR MATCHING NAMES

CROSS-REFERENCE TO RELATED APPLICATIONS

This application is a continuation of PCT Application No. PCT/CN2017/111604, filed on Nov. 17, 2017, which claims priority to Chinese Patent Application No. 201611055619.8, filed on Nov. 25, 2016, and each application is hereby incorporated by reference in its entirety.

TECHNICAL FIELD

The present application relates to the field of computer software technologies, and in particular, to a method and an apparatus for matching names.

BACKGROUND

Person name matching is a very important technology in the risk control field. For example, a risk control system records person names of determined unauthorized users in a blacklist. Then, when performing risk control operation, for each user that currently performs a service, a person name of each user is matched with each person name in the blacklist through scanning. If the matching succeeds, the user can be considered as an unauthorized user, and the service of the user is rejected, to prevent certain risks.

Person name matching can be classified into accurate person name matching and person name fuzzy matching. In comparison, person name fuzzy matching is more difficult in terms of technologies because it is difficult to control a proper fuzzy degree.

In the existing technology, a string matching algorithm is usually used to perform person name fuzzy matching, and a string matching degree threshold determines a fuzzy degree. However, the string matching degree threshold is all set according to experience. To reduce omission, the string matching degree threshold is usually set to a relatively low value. Consequently, the matching accuracy is relatively low, and a false alarm rate of the risk control system is relatively high.

SUMMARY

Implementations of the present application provide a method and an apparatus for matching names, to alleviate the following technical problem: in the existing technology, the relatively low matching accuracy and relatively high system false alarm rate happen when person name fuzzy matching is performed by using a string matching algorithm.

To alleviate the previous technical problem, the implementations of the present application are implemented as follows:

An implementation of the present application provides a method for matching names, including the following: obtaining a name to be matched; determining a standard name set used to match the name to be matched; detecting the name to be matched to determine whether the name to be matched is synonymous with at least one name in the standard name set but characters of the names are not identical; and determining a matching result of the name to be matched based on a detection result.

An implementation of the present application provides an apparatus for matching names, including the following: an acquisition module, configured to obtain a name to be matched; a determining module, configured to determine a standard name set used to match the name to be matched; a detection module, configured to detect the name to be matched to determine whether the name to be matched is synonymous with at least one name in the standard name set but characters of the names are not identical; and a matching module, configured to determine a matching result of the name to be matched based on a detection result.

The at least one technical solution used in the implementations of the present application can achieve the following beneficial effects: The name can include a person name. In practice, a person name to be matched may be different from an actual person name due to the timeliness and the uncertainty during data entry and the variability of the person name. This is also the reason for performing fuzzy matching. In the solution of the present application, for this reason, the person name to be matched is detected to determine whether the name to be matched is synonymous with at least one name in the standard name set but characters of the names are not identical, and a person name matching result is determined based on a detection result. Compared with the existing technology that a fuzzy degree is controlled only by using a string matching degree threshold set according to experience, the present application is more conducive to improving the accuracy of controlling the fuzzy degree. As such, the matching accuracy can be improved, and a false alarm rate of a risk control system can be reduced. Therefore, some or all of the problems in the existing technologies can be alleviated.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

Figure 1:
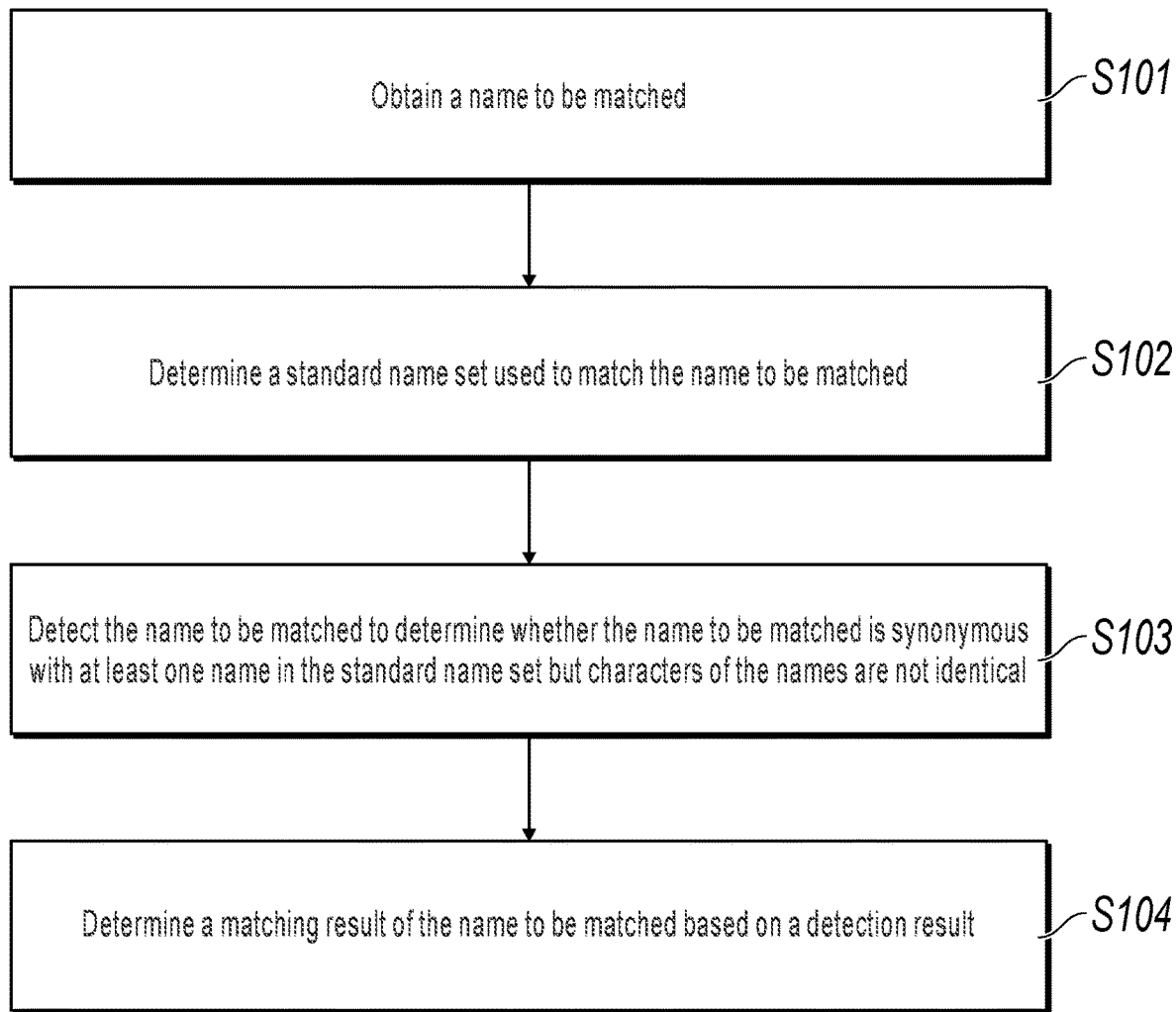
FIG. 1 is a schematic flowchart illustrating a method for matching names, according to an implementation of the present application.

Implementations of the present application provide a method and an apparatus for matching names.

To make a person skilled in the art understand the technical solutions in the present application better, the following clearly and comprehensively describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

As described above, in practice, a person name to be matched may be different from an actual person name due to the timeliness and the uncertainty during data entry and the variability of the person name (which mainly indicating a change in a "shape (namely, character)" of the person name). For ease of understanding, an English person name is used as an example. Common variation types and instances of an English person name are shown in Table 1.

TABLE 1

| Common variation type of an English person name | Instance of a person name variation type |
| --- | --- |
| Misspelling | Jaxson, Jakson, and Jaxon are originally expected to represent the same person name. Smyth and Smith are originally expected to represent the same person name. Spelling error. |
| Phonetic spelling difference | Michel, Michal, and Miguel are originally expected to represent the same person name. Misspelling caused by similar pronunciations. |
| Nickname | Mike, Mick, and Mikey represent nicknames of the same person. |
| Address term | Dr., Mr., etc. are terms of addressing a person, and do not affect a meaning of a person name when they appear together with the person name. |
| Synonym | Mohamed, Mohammed, and Mohammad are synonymous when appearing in a person name. |
| Abbreviation | A person name Rob is an abbreviation for Robbin, and Rob and Robbin are synonymous. A person name Bob is an abbreviation for Bobby, and Rob and Bobby are synonymous. |
| Multi-national language difference | Russian Brasov has a different meaning from Borisovna, and Spanish Juanita is synonymous with Juana. |

If only a string matching method is used to match a person name, it is possible that matching can be attempted for a variation type of "misspelling" a certain letter (actually, the matching succeeds accidentally, and there is no solid basis). However, the matching accuracy is very low for other variation types.

In the solutions of the present application, particular detection such as abbreviation detection, address term detection, multi-language detection, or alias detection can be performed for the other variation types, so that a situation that person names are synonymous but characters of the person names are not identical (in other words, the names are synonymous but different in shapes) can be considered comprehensively, and further the matching accuracy can be improved. It is worthwhile to note that "different shapes" can be different shapes that are "wrong" due to misspelling; but in the following implementations, can be mainly different shapes that are "reasonable and correct" due to the other variation types.

The solutions of the present application are not only applicable to person name matching, but also applicable to matching of names other than a person name, for example, a place name or an object name.

The solutions of the present application are described below in detail.

FIG. 1 is a schematic flowchart illustrating a method for matching names, according to an implementation of the present application. A device that a program executing the procedure can be installed on includes but is not limited to a personal computer, a large or medium computer, a computer cluster, a mobile phone, a tablet computer, a smart wearable device, a vehicle machine, etc. This process usually can be used in the risk control field, and is executed by a risk control system or a related system.

The procedure shown in FIG. 1 can include the following steps:

S101. Obtain a name to be matched.

In the present implementation of the present application, a language that the name to be matched belongs to is not limited, and can be English, Russian, Spanish, or Chinese. For ease of description, the following implementation is mainly described by using an example that the language that the name to be matched belongs to is English.

S102. Determine a standard name set used to match the name to be matched.

In the present implementation of the present application, the standard name set can be a subset screened out from a larger name set, or can be directly the larger name set. For ease of description, the screening here can be referred to as "preliminary screening". For example, in a scenario in the background, the larger name set can be a blacklist held by a risk control system.

In the previous situation, the subset can be a set that includes only names similar to the name to be matched. "Similar" here may not be so strict because there is a series of subsequent operations of further determining the similarity. It means that "fine screening" is performed subsequently. A matching range can be quickly reduced through preliminary screening, so that a workload of subsequent fine screening can be reduced, and the pertinence of fine screening can be improved, which is conducive to improving the efficiency of the solutions of the present application.

S103. Detect the name to be matched to determine whether the name to be matched is synonymous with at least one name in the standard name set but characters of the names are not identical.

In the present implementation of the present application, "the names are synonymous but characters of the names are not identical" that needs to be detected and determined is mainly caused by one or more variation types in Table 1, and the detection can include at least one of detections such as abbreviation detection, address term detection, multi-language detection, or alias detection, which are described below in detail.

In the present implementation of the present application, when there are multiple detections, each of the detections can be successively performed in order. Remaining detections may not be performed if a matching result of the name to be matched can be determined in the detection process. To improve the execution efficiency, the plurality of detections can be performed in parallel and then detection results can be summarized.

S104. Determine a matching result of the name to be matched based on a detection result.

In the present implementation of the present application, by performing step S103, the matching result of the name to be matched can be directly determined if it is determined that the name to be matched is synonymous with at least one name in the standard name set but characters of the names are not identical. In this situation, the detection process in step S103 is actually an entire matching process of the name to be matched.

If it is determined that the name to be matched does not satisfy the following condition: the name to be matched is synonymous with at least one name in the standard name set but characters of the names are not identical, matching can be further performed on the name to be matched by using another matching method to determine the matching result of the name to be matched.

Through the method shown in FIG. 1, the name can include a person name. In practice, a person name to be matched may be different from an actual person name due to the timeliness and the uncertainty during data entry and the variability of the person name. This is also the reason for performing fuzzy matching. In the solution of the present application, for this reason, the person name to be matched is detected to determine whether the name to be matched is synonymous with at least one name in the standard name set but characters of the names are not identical, and a person name matching result is determined based on a detection result. Compared with the existing technology that a fuzzy degree is controlled only by using a string matching degree threshold set according to experience, the present application is more conducive to improving the accuracy of controlling the fuzzy degree. As such, the matching accuracy can be improved, and a false alarm rate of the risk control system can be reduced. Therefore, some or all of the problems in the existing technologies can be alleviated.

Based on the method in FIG. 1, the present implementation of the present application further provides some implementations of the method and an extension solution, which are described below.

In the present implementation of the present application, the complexity of different names to be matched can be different, and included information can also be different. For some names to be matched that have a small volume of information or a simple information feature, it is difficult for the value of an obtained matching result to reach an expectation even if matching is performed on the names to be matched. For example, if a name is too simple and general, such as an English person name "Jim," "Jimmy," "David," "John," or "Mike," it is difficult to determine a certain person even if matching succeeds.

To alleviate the waste of processing resources used for name matching due to this situation, the name to be matched can be first filtered after being obtained, to determine whether to continue the matching. In addition, if the name to be matched is included in a white list, the similar problem exists, and the name to be matched can also be processed by using this method.

For steps S101 and S102, after the name to be matched is obtained, and prior to the standard name set used to match the name to be matched is determined, the following steps can be further performed: obtaining a predetermined set of names that do not need to be matched; determining whether the name to be matched is included in the set of names that do not need to be matched; and if yes, continuing to perform subsequent steps. Otherwise, matching may not be performed on the name to be matched.

In the present implementation of the present application, an implementation of step S102 (which corresponds to the previous situation of "preliminary screening") is used as an example for description. For step S102, the determining a standard name set used to match the name to be matched can include the following: determining a first name set that can be used to match the name to be matched; and determining the standard name set used to match the name to be matched by performing similarity matching on each word included in the name to be matched and each word included in a name in the first name set.

There is also a plurality of implementations of how to perform similarity matching. Word segmentation matching can be performed on the name to be matched, or full-text matching can be performed on the name to be matched, etc.

In an example of word segmentation matching, the determining the standard name set used to match the name to be matched by performing similarity matching on each word included in the name to be matched and each word included in a name in the first name set can include the following: obtaining an index of each name included in the first name set, where the index of the name is any word included in the name; segmenting the name to be matched to obtain each word included in the name to be matched; performing similarity matching on each word included in the name to be matched and each index to obtain a subset of the first name set. The obtained subset includes a name indexed by each index that is successfully matched; and determining the standard name set used to match the name to be matched based on each subset.

The index in the previous example is pre-established, and an advantage of performing word segmentation matching based on the index is that a speed of obtaining a name needed in the set in the matching process can be effectively accelerated. If word segmentation matching is not performed based on the index, word segmentation matching still can be implemented (for example, a data table that stores the set is directly queried for a needed name by using a Select statement for word segmentation matching), except that the efficiency may be affected.

Further, the performing similarity matching on each word included in the name to be matched and each index can include the following: performing similarity matching on each word included in the name to be matched and each index by using a string matching algorithm, where the string matching algorithm can include one or more algorithms, for example, a prefix tree matching algorithm, a dictionary tree matching algorithm, a string similarity matching algorithm, and a pronunciation similarity matching algorithm. Here, using the string matching algorithm is merely a better method, or another algorithm, such as a text matching algorithm, that can be used to implement similarity matching can be used.

There may be a plurality of implementations of determining the standard name set used to match the name to be matched based on each subset. For example, if N string matching algorithms are used, for each of M words obtained through word segmentation, each string matching algorithm is used to match the word with each index to correspondingly obtain N subsets. Then a union set of the N subsets is taken. A total of M union sets are obtained, and each name whose total number of occurrences in the M union sets exceeds a specified threshold is selected and determined as the standard name set. For another example, N subsets are obtained, and then an intersection set of the N subsets is taken and determined as the standard name set.

Figure 2:
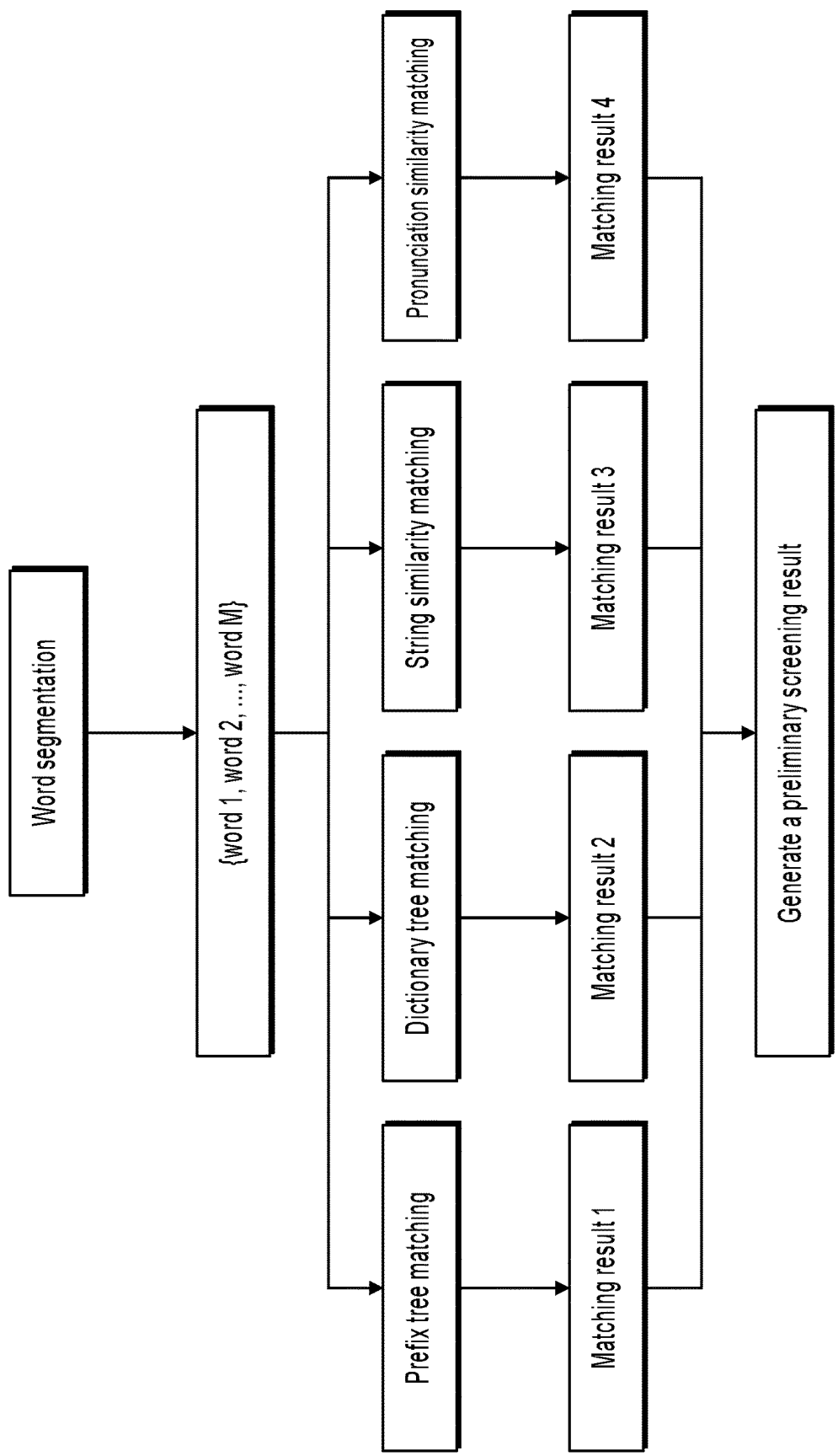
FIG. 2 is a schematic flowchart illustrating an implementation of preliminary screening in a method for matching names in an actual application scenario, according to an implementation of the present application.

The "preliminary screening" process is described above. For ease of understanding, an implementation of the present application further provides a schematic flowchart illustrating an implementation of the preliminary screening in the method for matching names in an actual application scenario, as shown in FIG. 2.

In the actual application scenario, assume that the first name set corresponds to a list of English person names, an index of each name in the list is predetermined (related information other than the corresponding name can be indexed by using the index), the index is a word in the name that corresponds to the index, each index is included in an index table established by using a word that corresponds to the index as a primary key, the name to be matched is an English person name "Kit Wai Jackson Wong," and a space is used as a delimiter to segment the person name, and a word segmentation result is shown in Table 2.

TABLE 2

| Person name to be matched | Kit Wai Jackson Wong | | | |
|---|---|---|---|---|
| After word segmentation | Word 1: Kit | Word 2: Wai | Word 3: Jackson | Word 4: Wong |

In FIG. 2, M=4, and the word segmentation result is {Kit, Wai, Jackson, Wong}. Each word obtained through word segmentation is matched with each index by using a prefix tree matching algorithm, a dictionary tree matching algorithm, a string similarity matching algorithm (such as a Simstring algorithm), and a pronunciation similarity matching algorithm (such as a metaphone algorithm), to output a name set that corresponds to indexes of a single word that are obtained by using the four matching algorithms: matching results 1, 2, 3, and 4.

A union set of the matching results of each word is taken to obtain a comprehensive matching result of each word.

Names included in at least two comprehensive matching results are selected to form a set, and the set is used as a generated preliminary screening result.

In the present implementation of the present application, after the standard name set is determined, the name to be matched can be detected. However, one or more types of preprocessing can be further performed prior to the detection. The preprocessing is conducive to improving the reliability of a subsequent detection result. The preprocessing can include alignment processing, capital and lowercase unification processing, simplified-traditional processing, etc.

Alignment processing is used as an example. For step S103, prior to the detecting the name to be matched, the following processing can be further performed: aligning each word included in a name in the standard name set with each word included in the name to be matched based on the similarity between each word included in the name in the standard name set and each word included in the name to be matched.

In practice, a principle of performing alignment processing based on the similarity can be a similarity-based maximization principle. To be specific, locations of names that include words with the maximum similarity are aligned.

For example, assume that the name to be matched is "Kate Lee Smith," and an alignment result of a name such as "Smith Catherine Lee" in the standard name set is shown in Table 3.

TABLE 3

| Name to be matched | Kate | Lee | Smith |
|---|---|---|---|
| Name obtained after alignment processing in the standard name set | Catherine | Lee | Smith |

Further, when alignment processing is performed, for step S103, the detecting the name to be matched can include the following: detecting the name to be matched based on the aligned standard name set to determine whether the name to be matched is synonymous with at least one name in the standard name set but characters of the names are not identical.

In the present implementation of the present application, the detection in step S103 is a key part for improving the matching accuracy of person name fuzzy matching. For step S103, the detecting the name to be matched includes the following: performing at least one of abbreviation detection, address term detection, multi-language detection, or alias detection on the name to be matched to determine whether the name to be matched is synonymous with at least one name in the standard name set but characters of the names are not identical. The several detections are separately described below.

In the present implementation of the present application, acronym detection is most common in the abbreviation detection. In addition to the acronym detection, there is abbreviation detection with omission of a partitive. In an implementation, the performing abbreviation detection on the name to be matched can include the following: obtaining predetermined abbreviation contrast combination data, where each abbreviation contrast combination reflects an abbreviation mapping relationship between at least one word and an abbreviation of the word; detecting whether a word included in the name to be matched has the abbreviation mapping relationship with a word included in a name in the standard name set based on the abbreviation contrast combination data; and determining, based on a detection result, whether the name to be matched is synonymous with at least one name in the standard name set but characters of the names are not identical.

For example, if it is predetermined that an English person name "Ben Williams" can be abbreviated to "B. Williams," "Ben Williams" and "B. Williams" can be used as an abbreviation contrast combination. If it is detected that the name to be matched and a name in the standard name set are the abbreviation contrast combination, it can be determined that there is a situation that the names are synonymous but characters of the names are not identical.

In the present implementation of the present application, the performing address term detection on the name to be matched can include the following: obtaining predetermined address term data; detecting whether the name to be matched includes the address term, where it is considered that the address term does not affect a meaning of the name that includes the address term; and determining, based on a detection result, whether the name to be matched is synonymous with at least one name in the standard name set but characters of the names are not identical.

In terms of a person name, an address term is generally a word attached to at least a part of the original person name, such as an honorific title (such as Mr. or Miss.) or a title (such as Dr. or Prof). In a person name matching environment, the address term does not affect a meaning of the at least a part of the original person name that corresponds to the address term. Therefore, if it is determined that the name to be matched includes the address term, and other parts other than the address term can match a name in the standard name set, it can be determined that the name to be matched is synonymous with at least one name in the standard name set but characters of the names are not identical.

In the present implementation of the present application, the performing alias detection on the name to be matched can include the following: obtaining predetermined alias contrast combination data, where each alias contrast combination reflects an alias mapping relationship between at least one word and an alias of the word; detecting whether a word included in the name to be matched has the alias mapping relationship with a word included in a name in the standard name set based on the alias contrast combination data; and determining, based on a detection result, whether the name to be matched is synonymous with at least one name in the standard name set but characters of the names are not identical.

In practice, the alias can include a nickname (for example, Mick in Table 1 is a nickname of Mikey) of a name that corresponds to the alias or a synonymous name of the name that corresponds to the alias in different fields. For the latter, different fields can be different regions (for example, different countries or different provinces), different languages (for example, languages of different countries or languages of different nationalities), different industries, etc.

Correspondingly, at least one of the following is performed: a nickname of the name to be matched is detected, or a synonymous name of the name to be matched in different fields is detected.

The alias also does not affect a meaning of the name that corresponds to the alias. Therefore, if it is determined that the name to be matched is an alias of a name in the standard name set, it can be determined that the name to be matched is synonymous with at least one name in the standard name set but characters of the names are not identical.

It is worthwhile to note that storage forms of the contrast combination data and the address term data described above are not limited in the present application. A common method is to store the contrast combination data and the address term data in a corresponding data table and read the data from a database when the data needs to be used.

In the present implementation of the present application, the performing multi-language detection on the name to be matched can include the following: determining a language that corresponds to the name to be matched; obtaining at least one of a spelling deformation synonym rule or a spelling deformation homonym rule of at least one of the language or another language; and detecting the name to be matched according to at least one of the spelling deformation synonym rule or the spelling deformation homonym rule to determine whether the name to be matched is synonymous with at least one name in the standard name set but characters of the names are not identical.

Multi-language detection is mainly aimed at the following situation, for example, English "Pooh" is spelled as "Puh" in German, and the two words are synonymous when appearing in person names.

It is worthwhile to note that an algorithm used to calculate a string matching degree can be used in the detections performed previously.

In the present implementation of the present application, the determining a matching result of the name to be matched based on a detection result can include the following: determining the at least one name as the matching result of the name to be matched if it is determined that the name to be matched is synonymous with the at least one name in the standard name set but the characters of the names are not identical; or otherwise (to be specific, when the matching fails through the previous detection), determining the matching result of the name to be matched by matching the name to be matched with a name in the standard name set by using one or more similarity algorithms.

In the present implementation of the present application, the plurality of similarity algorithms can be based on different dimensions, and therefore can be conducive to improving the reliability of the matching result. According to such an idea, the similarity algorithm can be an algorithm (such as an n-gram algorithm) used to calculate a text matching degree, an algorithm (such as a Phonex algorithm) used to calculate a phonetic matching degree, an algorithm (such as a Jaro-Winkler algorithm) used to calculate a string matching degree, etc.

When the plurality of similarity algorithms is used, matching results that correspond to the similarity algorithms can be comprehensively measured to obtain a comprehensive matching result. A measurement method is not limited in the present application, and a common method is weighting summation.

For example, when the n-gram algorithm is used, an algorithm input is each word included in the name to be matched and each word at an aligned location of the word, and an algorithm output is a text matching degree of each pair of aligned words, and is denoted as F1.

When the Jaro-Winkler algorithm is used, an algorithm input is each word included in the name to be matched and each word at an aligned location of the word, and an algorithm output is a string matching degree of each pair of aligned words, and is denoted as F2.

When the Phonex algorithm is used, an algorithm input is each word included in the name to be matched and each word at an aligned location of the word, and an algorithm output is a phonetic matching degree of each pair of aligned words, and is denoted as F3.

A comprehensive matching degree F. of each pair of aligned words is obtained by performing weighting summation on the text matching degree, the string matching degree, and the phonetic matching degree, as shown in the following equation:

$$F = w1*F1 + w2*F2 + w3*F3, \text{ where } w1+w2+w3=1.$$

Based on the comprehensive matching degree F. of each pair of words, a result of matching between the name to be matched and the name in the standard name set is obtained by calculating an average value. For example, for a pair of names in Table 3, an obtained matching result is shown in Table 4.

TABLE 4

| Detected name | Kate | Lee | Smith |
| --- | --- | --- | --- |
| Name in a list | Catherine | Lee | Smith |
| Comprehensive matching degree | 0.872 | 1 | 1 |
| Matching result | (0.872 + 1 + 1)/3 = 0.957 | | |

The detection and matching process after the preliminary screening is described above. In this process, a plurality of matching-related algorithms can be used. During implementation of the solutions of the present application, the algorithms that can be used can be integrated, and this process is a process of performing fuzzy matching by using an integrated algorithm.

In the present implementation of the present application, after the fuzzy matching is performed by using the integration algorithm, some post filtering based on certain rules can be further performed, for example, the matching degree in the matching result is mapped to text description information, or the matching degree is properly compensated for or reduced based on a certain scenario.

Figure 3:
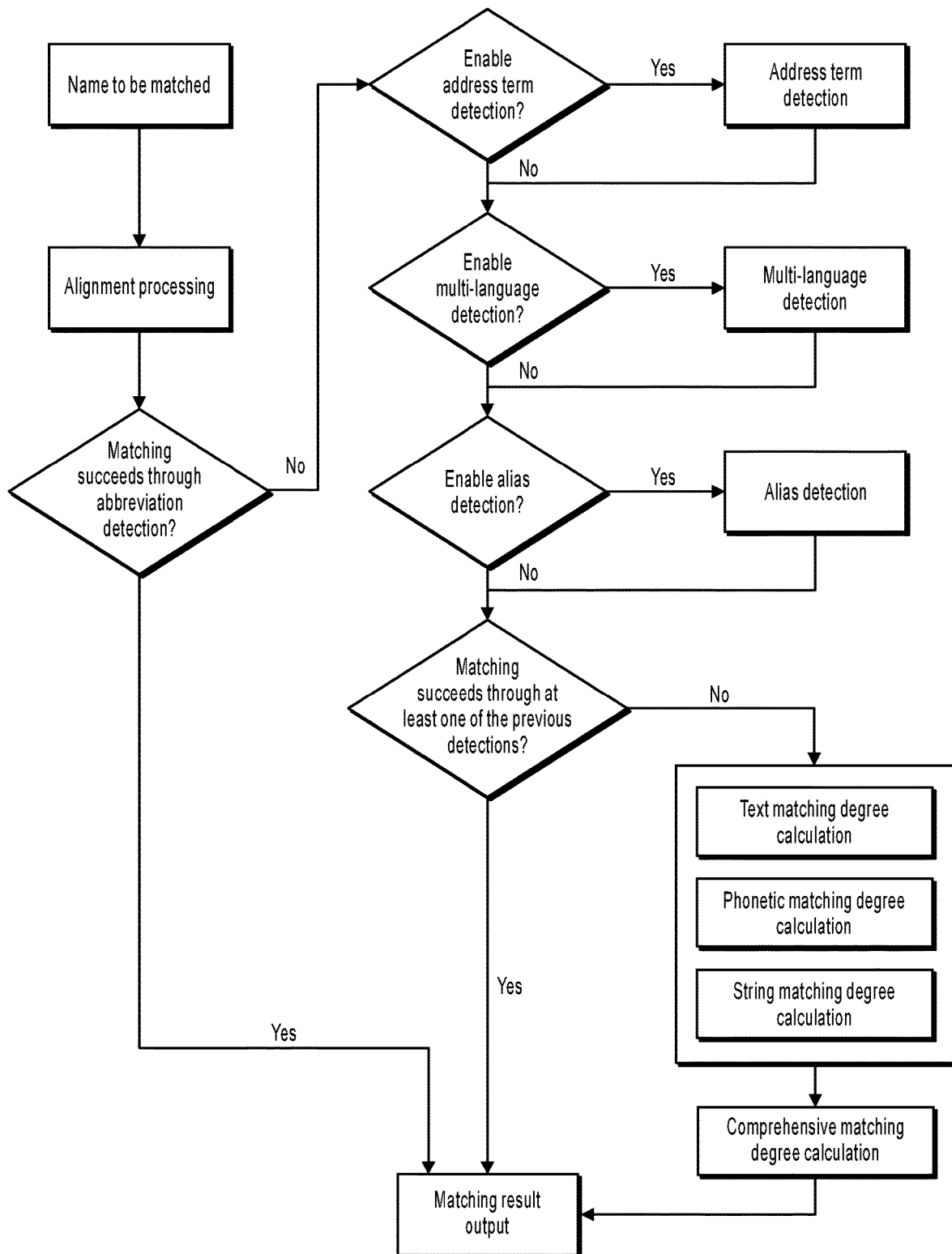
FIG. 3 is a schematic flowchart illustrating an implementation of performing fuzzy matching by using an integrated algorithm in a method for matching names in an actual application scenario, according to an implementation of the present application.

Based on the previous description, more intuitively, an implementation of the present application further provides a schematic flowchart illustrating an implementation of performing fuzzy matching by using an integrated algorithm in a method for matching names in an actual application scenario, as shown in FIG. 3. In FIG. 3, a sequence of performing various detections and calculating matching degrees in various methods is merely an example, and is not for limiting the present application.

In FIG. 3, if matching of a name to be matched succeeds through any one of the previous detections, a matching result can be directly output; otherwise, the matching result of the name to be matched can be determined and output by using one or more methods for matching degree calculation (for example, text matching degree calculation, phonetic matching degree calculation, and string matching degree calculation).

Certainly, various detections and matching degree calculation in various methods can also be completely performed, and then various detection results and matching degree calculation results in various methods can be comprehensively considered, to determine a matching result of a string to be matched.

Figure 4:
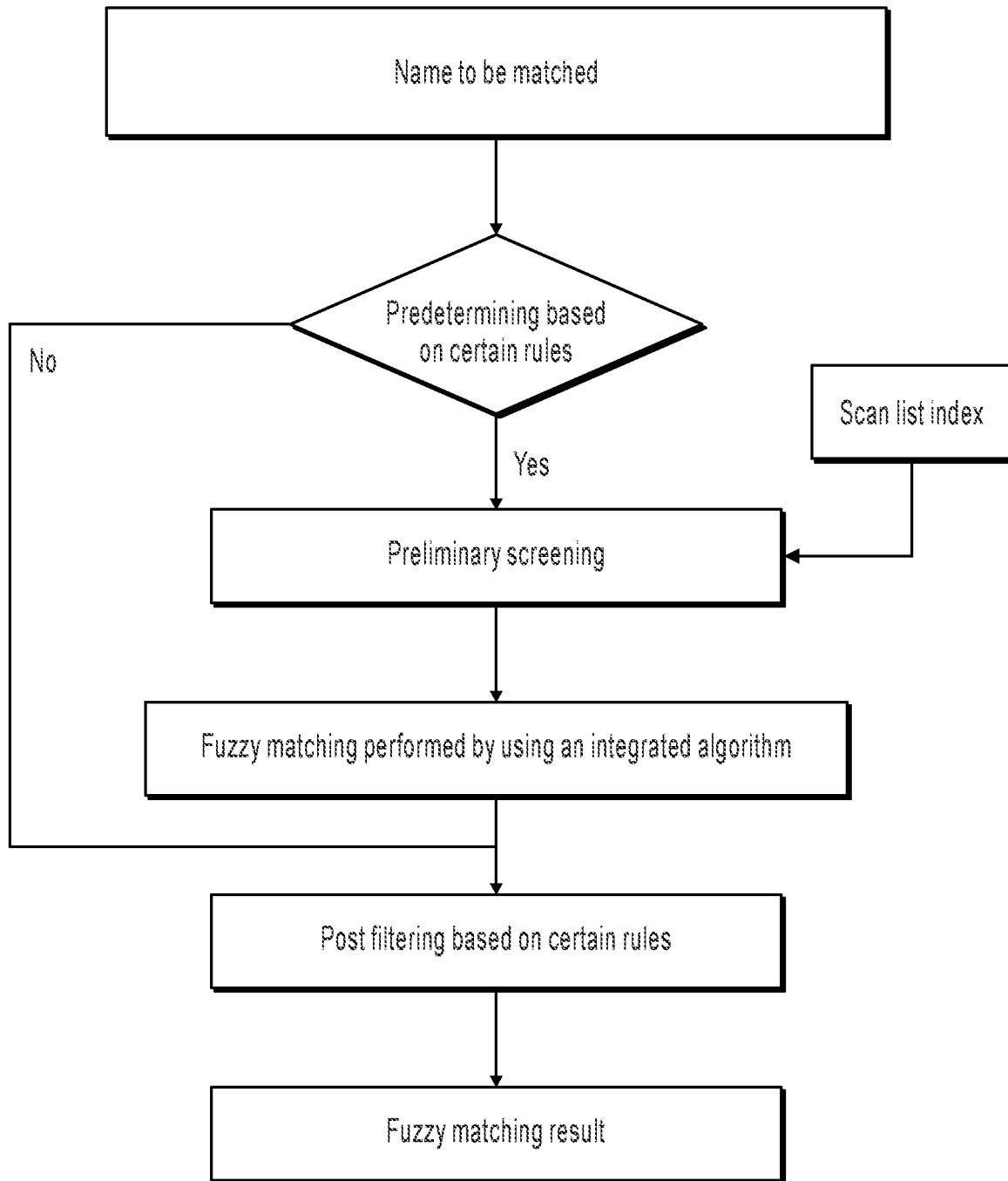
FIG. 4 is a schematic flowchart illustrating an implementation of a method for matching names in an actual application scenario, according to an implementation of the present application.

Further, an implementation of the present application further provides a schematic flowchart illustrating an implementation of a method for matching names in an actual application scenario, as shown in FIG. 4. In FIG. 4, predetermining based on certain rules can include the following: determining whether a name to be matched is not included in a set of names that do not need to be matched, where a scan list index is an index of names in the standard name set.

Steps in FIGS. 3 and 4 are described above in detail, and details are omitted here for simplicity.

Figure 5:
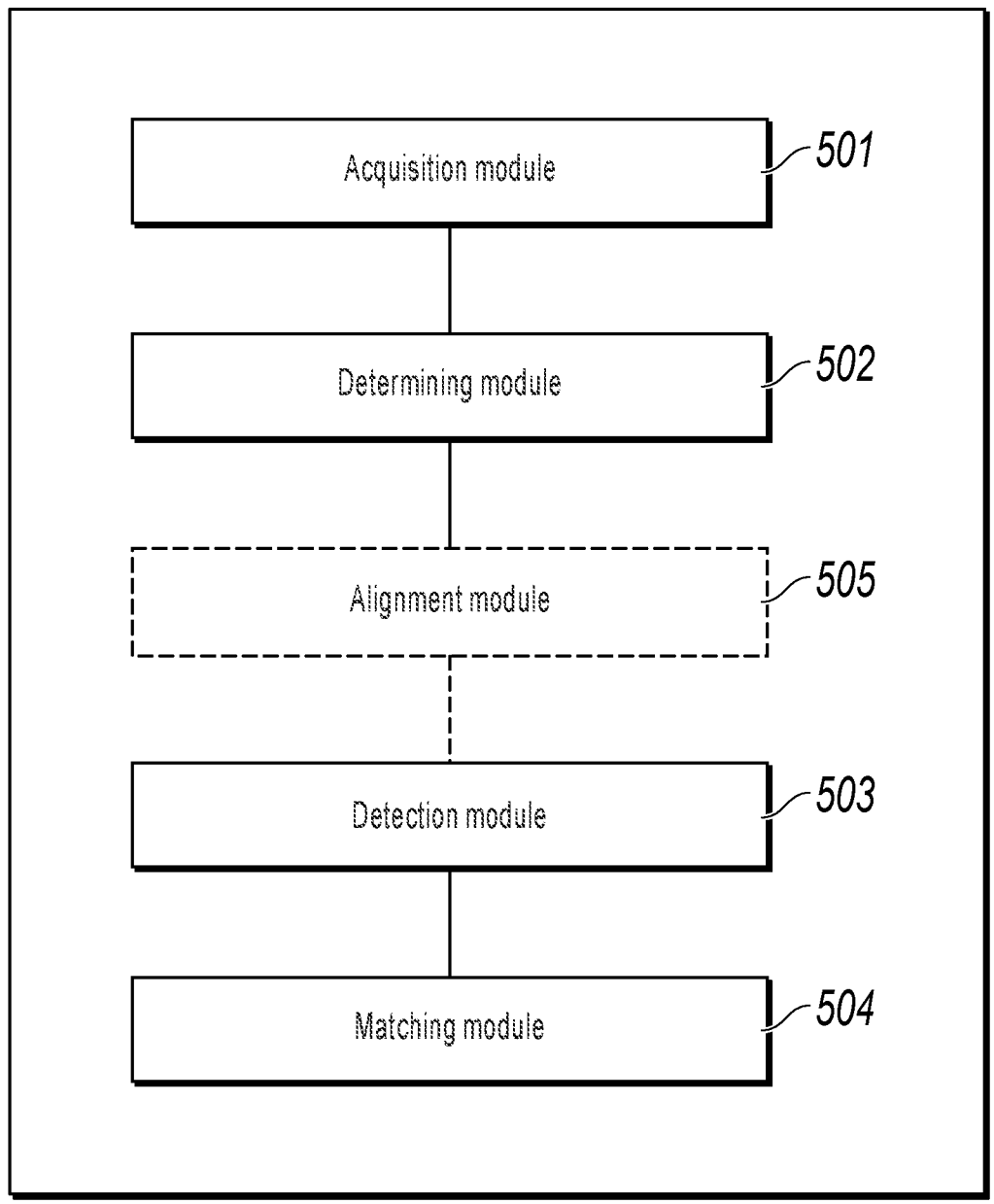
FIG. 5 is a schematic structural diagram illustrating an apparatus for matching names and corresponding to FIG. 1, according to an implementation of the present application.

The method for matching names provided in the present implementation of the present application is described above. As shown in FIG. 5, based on the same invention idea, an implementation of the present application further provides a corresponding apparatus.

FIG. 5 is a schematic structural diagram illustrating an apparatus for matching names and corresponding to FIG. 1, according to an implementation of the present application. A dashed line represents an optional module, and the apparatus includes the following: an acquisition module 501, configured to obtain a name to be matched; a determining module 502, configured to determine a standard name set used to match the name to be matched; a detection module 503, configured to detect the name to be matched to determine whether the name to be matched is synonymous with at least one name in the standard name set but characters of the names are not identical; and a matching module 504, configured to determine a matching result of the name to be matched based on a detection result.

Optionally, prior to determining the standard name set used to match the name to be matched, the determining module 502 is configured to obtain a predetermined set of names that do not need to be matched, and determine that the name to be matched is not included in the set of names that do not need to be matched.

Optionally, the determining module 502 is configured to determine a standard name set used to match the name to be matched includes the following:

The determining module 502 is configured to obtain a first name set that can be used to match the name to be matched, and determine the standard name set used to match the name to be matched by performing similarity matching on each word included in the name to be matched and each word included in a name in the first name set.

Optionally, the determining module 502 is configured to determine the standard name set used to match the name to be matched by performing similarity matching on each word included in the name to be matched and each word included in a name in the first name set includes the following:

The determining module 502 is configured to obtain an index of each name included in the first name set, where the index of the name is any word included in the name; segment the name to be matched to obtain each word included in the name to be matched; perform similarity matching on each word included in the name to be matched and each index to obtain a subset of the first name set. The obtained subset includes a name indexed by each index that is successfully matched; and determine the standard name set used to match the name to be matched based on the subset.

Optionally, the determining module 502 is configured to perform similarity matching on each word included in the name to be matched and each index includes the following:

The determining module 502 is configured to perform similarity matching on each word included in the name to be matched and each index by using a string matching algorithm, where the string matching algorithm includes at least one of the following: a prefix tree matching algorithm, a dictionary tree matching algorithm, a string similarity matching algorithm, or a pronunciation similarity matching algorithm.

Optionally, the apparatus further includes the following: an alignment module 505, configured to align each word included in a name in the standard name set with each word included in the name to be matched based on the similarity between each word included in the name in the standard name set and each word included in the name to be matched prior to the detection module 503 detects the name to be matched.

That the detection module 503 is configured to detect the name to be matched includes the following:

The detection module 503 is configured to detect the name to be matched based on the aligned standard name set to determine whether the name to be matched is synonymous with at least one name in the standard name set but characters of the names are not identical.

Optionally, the detection module 503 is configured to detect the name to be matched includes the following: the detection module 503 is configured to perform at least one of abbreviation detection, address term detection, multi-language detection, or alias detection on the name to be matched to determine whether the name to be matched is synonymous with at least one name in the standard name set but characters of the names are not identical.

Optionally, the detection module 503 is configured to perform abbreviation detection on the name to be matched includes the following:

The detection module is configured to obtain predetermined abbreviation contrast combination data, where each abbreviation contrast combination reflects an abbreviation mapping relationship between at least one word and an abbreviation of the word; detect whether a word included in the name to be matched has the abbreviation mapping relationship with a word included in a name in the standard name set based on the abbreviation contrast combination data; and determine, based on a detection result, whether the name to be matched is synonymous with at least one name in the standard name set but characters of the names are not identical.

Optionally, the detection module 503 is configured to perform address term detection on the name to be matched includes the following:

The detection module 503 is configured to obtain predetermined address term data; detect whether the name to be matched includes the address term, where it is considered that the address term does not affect a meaning of the name that includes the address term; and determine, based on a detection result, whether the name to be matched is synonymous with at least one name in the standard name set but characters of the names are not identical.

Optionally, the alias includes a nickname of a name that corresponds to the alias, or a synonymous name of a name that corresponds to the alias in different fields. That the detection module 503 is configured to perform alias detection on the name to be matched includes the following:

The detection module 503 is configured to perform at least one of the following: detecting a nickname of the name to be matched, or detecting a synonymous name of the name to be matched in different fields.

Optionally, the detection module 503 is configured to perform multi-language detection on the name to be matched includes the following: the detection module 503 is configured to determine a language that corresponds to the name to be matched; obtain at least one of a spelling deformation synonym rule or a spelling deformation homonym rule of the language; and detect the name to be matched according to at least one of the spelling deformation synonym rule or the spelling deformation homonym rule, to determine whether the name to be matched is synonymous with at least one name in the standard name set but characters of the names are not identical.

Optionally, the detection module 503 is configured to perform alias detection on the name to be matched includes the following:

The detection module 503 is configured to obtain predetermined alias contrast combination data, where each alias contrast combination reflects an alias mapping relationship between at least one word and an alias of the word; detect whether a word included in the name to be matched has the alias mapping relationship with a word included in a name in the standard name set based on the alias contrast combination data; and determine, based on a detection result, whether the name to be matched is synonymous with at least one name in the standard name set but characters of the names are not identical.

Optionally, the matching module 504 is configured to determine a matching result of the name to be matched based on a detection result includes the following:

The matching module 504 is configured to determine the at least one name as the matching result of the name to be matched if the detection module 503 determines that the name to be matched is synonymous with the at least one name in the standard name set but the characters of the names are not identical; or otherwise, determine the matching result of the name to be matched by matching the name to be matched with a name in the standard name set by using one or more similarity algorithms.

Optionally, the similarity algorithm includes at least one of the following: an algorithm used to calculate a text matching degree, an algorithm used to calculate a phonetic matching degree, or an algorithm used to calculate a string matching degree.

Optionally, the name is a person name.

The apparatuses provided in the implementations of the present application are in a one-to-one correspondence with the methods. Therefore, the apparatuses and the methods have the similar beneficial technical effects. The beneficial technical effects of the methods have been described above in detail, and therefore the beneficial technical effects of the apparatuses are omitted here for simplicity.

In addition, application scenarios of the previous apparatuses and methods are not limited in the present application. In addition to the risk control field (for example, fields such as anti-money laundering and user authentication) mentioned in the background, the solutions of the present application are applicable to any other fields that may need to use the name matching technology.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor and a computer readable medium storing computer readable program code (such as software or firmware) that can be executed by the microprocessor or the processor, a logic gate, a switch, an application-specific integrated circuit (ASIC), a programmable logic controller, or a built-in microcontroller. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the apparatus above is described by dividing functions into various units. Certainly, when the present application is implemented, the functions of the units can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, a built-in processor, or a processor of another programmable data processing device to generate a machine, so that the instructions executed by the computer or the processor of the another programmable data processing device generate a device for implementing a specified function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction device. The instruction device implements a specified function in one or more processes in the flowcharts and/or in one or more blocks in the block diagrams.

These computer program instructions can be loaded onto the computer or another programmable data processing device, so that a series of operations and operations and steps are performed on the computer or the another programmable device, thereby generating computer-implemented processing. Therefore, the instructions executed on the computer or another programmable device provide steps for implementing a specified function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission medium. The computer storage medium can be used to store information accessible by the computing device. Based on the description in the present specification, the computer readable medium does not include transitory computer readable media (transitory media) such as a modulated data signal and carrier.

It is worthwhile to further note that, the terms "include," "comprise," or their any other variants are intended to cover a non-exclusive inclusion, so a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a particular task or implementing a particular abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations of the present specification are described in a progressive way. For the same or similar parts of the implementations, references can be made to the implementations. Each implementation focuses on a difference from other implementations. Particularly, a system implementation is basically similar to a method implementation, and therefore is described briefly. For related parts, references can be made to related descriptions in the method implementation.

The previous descriptions are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Figure 6:
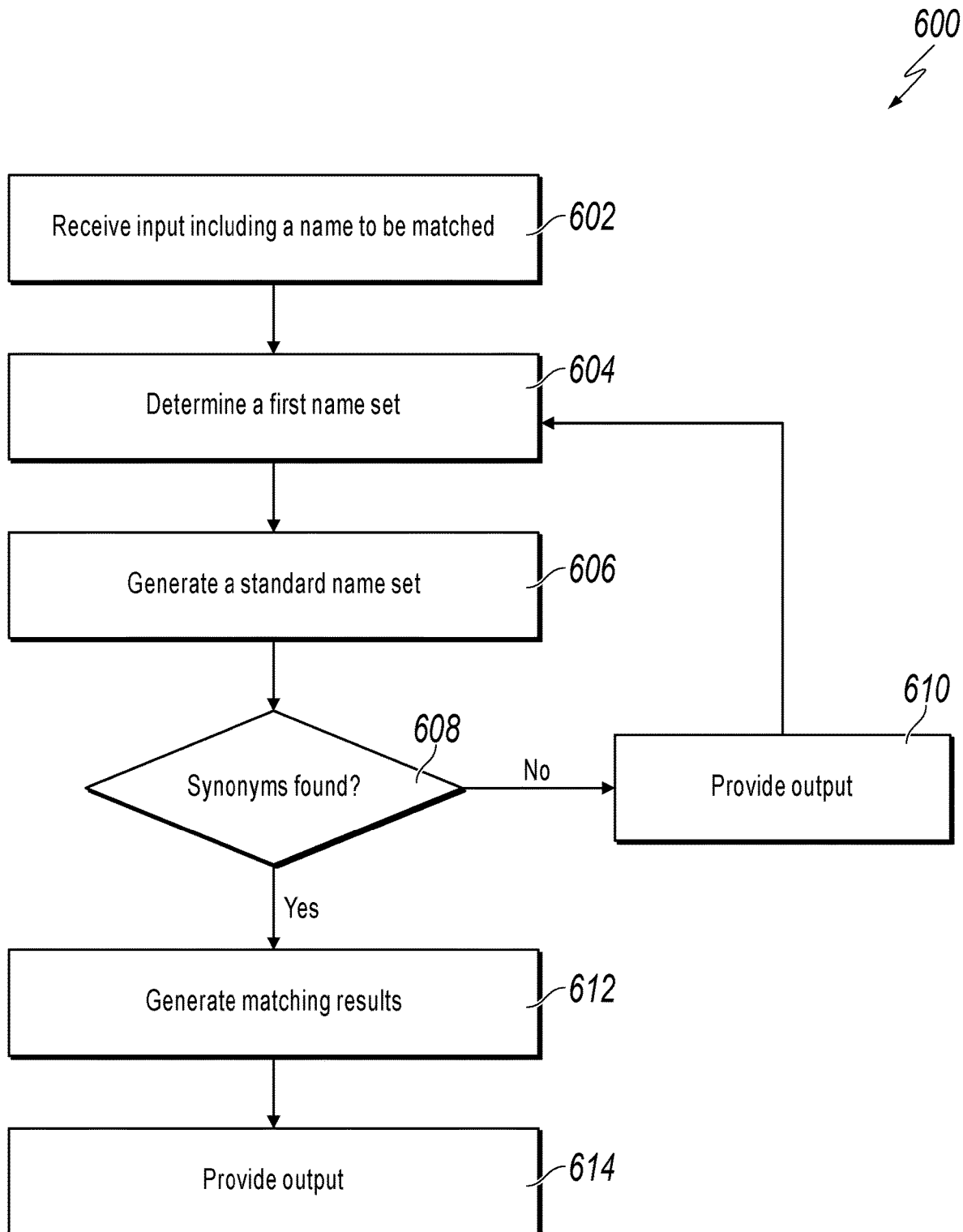
FIG. 6 is a flowchart illustrating an example of a computer-implemented method for matching names, according to an implementation of the present disclosure.

FIG. 6 is a flowchart illustrating an example of a computer-implemented method 600 for <general description of application>, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, an input including a name to be matched is received. The name (e.g., a person's name) includes a plurality of words. In some implementations, the input includes a data set associated with the name, such as an address. The address can include a home address. In some implementations, the data set can indicate a country of origin. In some implementations, the input is generated in response to a request for processing the data set (e.g., instantiation, modification or migration of the data set). The input can be processed to identify the name. For example, the name can be collected from legitimate emails and newsletters and names can include person names, trademark names, city, country, states, major domain names, and stock symbols and company names. The name can be identified by performing at least one of abbreviation detection, address term detection, multi-language detection, alias detection, and mapping. In some implementations, performing the abbreviation detection on the name includes retrieving predetermined abbreviation contrast combination data. Each abbreviation contrast combination reflects an abbreviation mapping relationship between at least one word and an abbreviation of the word. In some implementations, performing address term detection on the name to be matched includes retrieving predetermined address term data. The alias can include a nickname of a name that corresponds to the alias or a synonymous name of a name that corresponds to the alias in different fields. In some implementations, performing alias detection on the name to be matched includes detection of a nickname of the name to be matched, or detecting a synonymous name of the name to be matched in different fields. In some implementations, performing multi-language detection on the name to be matched includes determining a language that corresponds to the name to be matched. In some implementations, performing alias detection on the name to be matched includes retrieval of predetermined alias contrast combination data. Each alias contrast combination can reflect an alias mapping relationship between at least one word and an alias of the word. Mapping can include an array of non-alphabet string tokens to alphabet mapping. From 602, method 600 proceeds to 604.

At 604, a first name set corresponding to the name is determined. The first name set includes multiple elements. In some implementations, determining the first name set includes retrieving a predetermined set of names that do not need to be matched and determining that at least a portion of the name to be matched is not included in the predetermined set of names. In some implementations, the name set includes a dictionary of common legitimate words. The name set can correspond to a particular language (e.g., English, German, Spanish, etc.) or a family of languages (Germanic, Latin, Slavic, etc.). From 604, method 600 proceeds to 606.

At 606, each of the plurality of words is matched with each of the plurality of elements based on a similarity degree to generate a standard name set. In some implementations, matching each of the plurality of words includes: retrieving an index of each name included in the first name set, segmenting the name to obtain each word included in the name, performing similarity matching on each word included in the name and each index to obtain a subset of the first name set, and determining the standard name set used to match the name to be matched based on each subset. The index of the name can be any word included in the name. The obtained subset can include a name indexed by each index that is successfully matched. In some implementations, matching each of the plurality of words includes performing similarity matching on each word included in the name and each index by using a string matching algorithm. The string matching algorithm can include a prefix tree matching algorithm, a dictionary tree matching algorithm, a string similarity matching algorithm, or a pronunciation similarity matching algorithm. In some implementations, each word included in a standard name in the standard name set is aligned with each word included in the name to be matched based on the similarity between each word included in the standard name in the standard name set and each word included in the name to be matched. The similarity algorithm can include an algorithm used to calculate a text matching degree, an algorithm used to calculate a phonetic matching degree, or an algorithm used to calculate a string matching degree. In some implementations, the matching algorithms are based on performing fuzzy matching. From 606, method 600 proceeds to 608.

At 608, a determination is made as to whether the name is synonymous with at least one standard name in the standard name set. Synonyms can include one or more characters that are not identical. In some implementations, synonym identification includes determining whether the name is synonymous with the at least one standard name is based on the aligned standard name set. In some implementations, synonym identification includes detecting whether a word included in the name has the abbreviation mapping relationship with a word included in the standard name in the standard name set based on the abbreviation contrast combination data, and determining, based on a detection result, whether the name to be matched is synonymous with the at least one standard name in the standard name set. In some implementations, synonym identification includes detecting whether the name to be matched includes the address term and determining, based on a detection result, whether the name to be matched is synonymous with the at least one standard name in the standard name set. It can be considered that the address term does not affect a meaning of the name that includes the address term. In some implementations, synonym identification includes retrieval of a spelling deformation synonym rule or a spelling deformation homonym rule corresponding to the language and detection of the name to be matched according to at least one of the spelling deformation synonym rule or the spelling deformation homonym rule to determine whether the name to be matched is synonymous with the at least one standard name in the standard name set. In some implementations, synonym identification includes detecting whether a word included in the name to be matched has the alias mapping relationship with a word included in the standard name in the standard name set based on the alias contrast combination data and is determining, based on a detection result, whether the name to be matched is synonymous with the at least one standard name in the standard name set.

If it is determined that the name is not synonymous with the name candidate, method 600 proceeds to 610 to provide an output (e.g., an alert that a synonym was not found or a request for an additional input). From 610, method 600 returns to 602 to request an additional input or to 604 to determine an additional name set and execute a different matching algorithm.

Otherwise, if it is determined that the name is synonymous with the standard name, method 600 proceeds to 612.

At 612, a matching result of the name is generated. In some implementations, generating the matching result includes generating a list including the name that is synonymous with a standard name in the standard name set. The list can include multiple names identified by multiple matching algorithms or a filtered list of names that appeared multiple times as results to different matching algorithms. For example, if different matching algorithms generated identical results, the identical results are included in the final list of results and the singular results of any matching algorithm can be discarded. After 612, method 600 can stop.

Implementations of the present application provide methods and apparatuses for improving name matching. A challenge in matching names is that some data platforms require identification of names and corresponding nomenclature types before the data associated with names can be imported. Accordingly, creating or migrating large data sets (e.g., with millions or thousands of names) can require extensive periods of time to manually check databases to identify the appropriate nomenclature type for each name upon an account creation or data migration. As described in further detail herein, implementations of the present disclosure address this challenge. For example, in accordance with implementations, names can be instantiated and updated by automatically determining a nomenclature type and selectively changing a nomenclature type based on the determined name and nomenclature type.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for matching names, the computer-implemented method comprising:
   receiving an input comprising a name to be matched, the name comprising a plurality of words;
   determining a first name set corresponding to the name, the first name set comprising a plurality of elements;
   matching each of the plurality of words with each of the plurality of elements based on a similarity degree to generate a standard name set;
   determining that the name is synonymous with at least one standard name in the standard name set despite that one or more name characters of the name is different from one or more standard name characters of the standard name, comprising performing at least one of abbreviation detection, address term detection, multi-language detection, or alias detection on the name to be matched to determine whether the name to be matched is synonymous with the at least one standard name in the standard name set; and
   in response to determining that the name is synonymous with the at least one standard name, generating a matching result of the name comprising a weighted summation of a plurality of matching degrees of each of the plurality of words, the plurality of matching degrees comprising text matching degrees, phonetic matching degrees, and string matching degrees.

2. The computer-implemented method of claim 1, further comprising:
   retrieving a predetermined set of names that do not need to be matched; and
   determining that the name to be matched is not comprised in the predetermined set of names.

3. The computer-implemented method of claim 1, wherein matching each of the plurality of words comprises:
   determining an index of each name of the first name set, wherein the index comprises a pre-established word associated with the name;
   segmenting the name to be matched to obtain each word comprised in the name to be matched;

performing similarity matching on each word comprised in the name to be matched and each index by using a string matching algorithm to obtain a subset of the first name set, wherein the subset comprises a name indexed by each index that is successfully matched and the string matching algorithm comprises one or more of a prefix tree matching algorithm, a dictionary tree matching algorithm, a string similarity matching algorithm, and a pronunciation similarity matching algorithm; and determining the standard name set used to match the name to be matched based on each subset.

4. The computer-implemented method of claim 1, further comprising:

aligning, as an aligned standard name set, each word comprised in a name in the standard name set with each word comprised in the name to be matched based on a similarity between each word comprised in the standard name in the standard name set and each word comprised in the name to be matched; and wherein determining whether the name is synonymous with the at least one standard name comprises:

detecting the name to be matched based on the aligned standard name set to determine whether the name to be matched is synonymous with the at least one standard name in the standard name set.

5. The computer-implemented method of claim 1, wherein determining the matching result of the name to be matched based on a detection result comprises:

in response to determining that the name to be matched is synonymous with the at least one standard name in the standard name set, determining the at least one standard name as the matching result of the name to be matched.

6. The computer-implemented method of claim 1, wherein determining the matching result of the name to be matched based on a detection result comprises:

in response to determining that the name to be matched is not synonymous with the at least one standard name in the standard name set, determining the matching result of the name by matching the name with the standard name using one or more similarity algorithms.

7. A non-transitory, computer-readable medium storing one or more instructions executable by a computer system to perform operations comprising:

receiving an input comprising a name to be matched, the name comprising a plurality of words;

determining a first name set corresponding to the name, the first name set comprising a plurality of elements;

matching each of the plurality of words with each of the plurality of elements based on a similarity degree to generate a standard name set;

determining that the name is synonymous with at least one standard name in the standard name set despite that one or more name characters of the name is different from one or more standard name characters of the standard name, comprising performing at least one of abbreviation detection, address term detection, multi-language detection, or alias detection on the name to be matched to determine whether the name to be matched is synonymous with the at least one standard name in the standard name set; and in response to determining that the name is synonymous with the at least one standard name, generating a matching result of the name comprising a weighted summation of a plurality of matching degrees of each of the plurality of words, the plurality of matching degrees comprising text matching degrees, phonetic matching degrees, and string matching degrees.

8. The non-transitory, computer-readable medium of claim 7, further comprising:

retrieving a predetermined set of names that do not need to be matched; and determining that the name to be matched is not comprised in the predetermined set of names.

9. The non-transitory, computer-readable medium of claim 7, wherein matching each of the plurality of words comprises:

determining an index of each name of the first name set, wherein the index comprises a pre-established word associated with the name;

segmenting the name to be matched to obtain each word comprised in the name to be matched;

performing similarity matching on each word comprised in the name to be matched and each index by using a string matching algorithm to obtain a subset of the first name set, wherein the subset comprises a name indexed by each index that is successfully matched and the string matching algorithm comprises one or more of a prefix tree matching algorithm, a dictionary tree matching algorithm, a string similarity matching algorithm, and a pronunciation similarity matching algorithm; and determining the standard name set used to match the name to be matched based on each subset.

10. The non-transitory, computer-readable medium of claim 7, further comprising:

aligning, as an aligned standard name set, each word comprised in a name in the standard name set with each word comprised in the name to be matched based on a similarity between each word comprised in the standard name in the standard name set and each word comprised in the name to be matched; and wherein determining whether the name is synonymous with the at least one standard name comprises:

detecting the name to be matched based on the aligned standard name set to determine whether the name to be matched is synonymous with the at least one standard name in the standard name set.

11. The non-transitory, computer-readable medium of claim 7, wherein determining the matching result of the name to be matched based on a detection result comprises:

in response to determining that the name to be matched is synonymous with the at least one standard name in the standard name set, determining the at least one standard name as the matching result of the name to be matched.

12. The non-transitory, computer-readable medium of claim 7, wherein determining the matching result of the name to be matched based on a detection result comprises:

in response to determining that the name to be matched is not synonymous with the at least one standard name in the standard name set, determining the matching result of the name by matching the name with the standard name using one or more similarity algorithms.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving an input comprising a name to be matched, the name comprising a plurality of words;

determining a first name set corresponding to the name, the first name set comprising a plurality of elements;

matching each of the plurality of words with each of the plurality of elements based on a similarity degree to generate a standard name set;

determining that the name is synonymous with at least one standard name in the standard name set despite that one or more name characters of the name is different from one or more standard name characters of the standard name, comprising performing at least one of abbreviation detection, address term detection, multi-language detection, or alias detection on the name to be matched to determine whether the name to be matched is synonymous with the at least one standard name in the standard name set; and in response to determining that the name is synonymous with the at least one standard name, generating a matching result of the name comprising a weighted summation of a plurality of matching degrees of each of the plurality of words, the plurality of matching degrees comprising text matching degrees, phonetic matching degrees, and string matching degrees.

14. The computer-implemented system of claim 13, further comprising:

retrieving a predetermined set of names that do not need to be matched; and determining that the name to be matched is not comprised in the predetermined set of names.

15. The computer-implemented system of claim 13, wherein matching each of the plurality of words comprises:

determining an index of each name of the first name set, wherein the index comprises a pre-established word associated with the name;

segmenting the name to be matched to obtain each word comprised in the name to be matched;

performing similarity matching on each word comprised in the name to be matched and each index by using a string matching algorithm to obtain a subset of the first name set, wherein the subset comprises a name indexed by each index that is successfully matched and the string matching algorithm comprises one or more of a prefix tree matching algorithm, a dictionary tree matching algorithm, a string similarity matching algorithm, and a pronunciation similarity matching algorithm; and determining the standard name set used to match the name to be matched based on each subset.

16. The computer-implemented system of claim 13, further comprising:

aligning, as an aligned standard name set, each word comprised in a name in the standard name set with each word comprised in the name to be matched based on a similarity between each word comprised in the standard name in the standard name set and each word comprised in the name to be matched; and wherein determining whether the name is synonymous with the at least one standard name comprises:

detecting the name to be matched based on the aligned standard name set to determine whether the name to be matched is synonymous with the at least one standard name in the standard name set.

17. The computer-implemented system of claim 13, wherein determining the matching result of the name to be matched based on a detection result comprises:

in response to determining that the name to be matched is synonymous with the at least one standard name in the standard name set, determining the at least one standard name as the matching result of the name to be matched; or in response to determining that the name to be matched is not synonymous with the at least one standard name in the standard name set, determining the matching result of the name by matching the name with the standard name using one or more similarity algorithms.

* * * * *